(12) United States Patent
Avudaiyappan et al.

(10) Patent No.: US 9,916,253 B2
(45) Date of Patent: Mar. 13, 2018

(54) METHOD AND APPARATUS FOR SUPPORTING A PLURALITY OF LOAD ACCESSES OF A CACHE IN A SINGLE CYCLE TO MAINTAIN THROUGHPUT

(71) Applicant: Intel Corporation, Santa Clara, CA (US)

(72) Inventors: Karthikeyan Avudaiyappan, Sunnyvale, CA (US); Sourabh Alurkar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 23 days.

(21) Appl. No.: 14/173,602

(22) Filed: Feb. 5, 2014

(65) Prior Publication Data

US 2014/0156947 A1  Jun. 5, 2014

Related U.S. Application Data

(63) Continuation-in-part of application No. 13/561,528, filed on Jul. 30, 2012, now Pat. No. 9,430,410.
(Continued)

(51) Int. Cl.
*G06F 13/00* (2006.01)
*G06F 12/0895* (2016.01)

(52) U.S. Cl.
CPC .............................. *G06F 12/0895* (2013.01)

(58) Field of Classification Search
CPC ............ G06F 12/0866; G06F 12/0897; G06F 12/0848; G06F 12/0888; G06F 12/0875
See application file for complete search history.

(56) References Cited

U.S. PATENT DOCUMENTS

| 4,075,704 A | 2/1978 | O'Leary |
|---|---|---|
| 4,245,344 A | 1/1981 | Richter |

(Continued)

FOREIGN PATENT DOCUMENTS

| CN | 1305150 A | 7/2001 |
|---|---|---|
| EP | 0596636 | 5/1994 |

(Continued)

OTHER PUBLICATIONS

Notice of Allowance from U.S. Appl. No. 13/561,570, dated May 20, 2015, 3 pages.
(Continued)

*Primary Examiner* — Ryan Bertram
*Assistant Examiner* — Trang K Ta
(74) *Attorney, Agent, or Firm* — Nicholson De Vos Webster & Elliott LLP

(57) ABSTRACT

A method for supporting a plurality of requests for access to a data cache memory ("cache") is disclosed. The method comprises accessing a first set of requests to access the cache, wherein the cache comprises a plurality of blocks. Further, responsive to the first set of requests to access the cache, the method comprises accessing a tag memory that maintains a plurality of copies of tags for each entry in the cache and identifying tags that correspond to individual requests of the first set. The method also comprises performing arbitration in a same clock cycle as the accessing and identifying of tags, wherein the arbitration comprises: (a) identifying a second set of requests to access the cache from the first set, wherein the second set accesses a same block within the cache; and (b) selecting each request from the second set to receive data from the same block.

14 Claims, 7 Drawing Sheets

Related U.S. Application Data

(60) Provisional application No. 61/800,498, filed on Mar. 15, 2013.

(56) References Cited

U.S. PATENT DOCUMENTS

| | | | |
|---|---|---|---|
| 4,356,550 A | 10/1982 | Katzman et al. | |
| 4,414,624 A | 11/1983 | Summer, Jr. et al. | |
| 4,524,415 A | 6/1985 | Mills, Jr. et al. | |
| 4,527,237 A | 7/1985 | Frieder et al. | |
| 4,577,273 A | 3/1986 | Hopper et al. | |
| 4,597,061 A | 6/1986 | Cline et al. | |
| 4,600,986 A | 7/1986 | Scheuneman et al. | |
| 4,633,434 A | 12/1986 | Scheuneman | |
| 4,682,281 A | 7/1987 | Woffinden et al. | |
| 4,816,991 A | 3/1989 | Watanabe et al. | |
| 4,920,477 A | 4/1990 | Colwell et al. | |
| 5,294,897 A | 3/1994 | Notani et al. | |
| 5,317,705 A | 5/1994 | Gannon et al. | |
| 5,317,754 A | 5/1994 | Blandy et al. | |
| 5,548,742 A | 8/1996 | Wang et al. | |
| 5,559,986 A * | 9/1996 | Alpert | G06F 12/0851 711/127 |
| 5,574,878 A | 11/1996 | Onodera et al. | |
| 5,581,725 A | 12/1996 | Nakayama | |
| 5,634,068 A | 5/1997 | Nishtala et al. | |
| 5,752,260 A * | 5/1998 | Liu | 711/129 |
| 5,754,818 A | 5/1998 | Mohamed | |
| 5,787,494 A | 7/1998 | Delano et al. | |
| 5,793,941 A | 8/1998 | Pencis et al. | |
| 5,802,602 A | 9/1998 | Rahman et al. | |
| 5,806,085 A | 9/1998 | Berliner | |
| 5,813,031 A | 9/1998 | Chou et al. | |
| 5,835,951 A | 11/1998 | McMahan | |
| 5,852,738 A | 12/1998 | Bealkowski et al. | |
| 5,860,146 A | 1/1999 | Vishin et al. | |
| 5,864,657 A | 1/1999 | Stiffler | |
| 5,872,985 A | 2/1999 | Kimura | |
| 5,881,277 A | 3/1999 | Bondi et al. | |
| 5,903,750 A | 5/1999 | Yeh et al. | |
| 5,905,509 A | 5/1999 | Jones et al. | |
| 5,918,251 A | 6/1999 | Yamada et al. | |
| 5,956,753 A | 9/1999 | Glew et al. | |
| 5,974,506 A | 10/1999 | Sicola et al. | |
| 6,016,533 A | 1/2000 | Tran | |
| 6,073,230 A | 6/2000 | Pickett et al. | |
| 6,075,938 A | 6/2000 | Bugnion et al. | |
| 6,088,780 A | 7/2000 | Yamada et al. | |
| 6,092,172 A | 7/2000 | Nishimoto et al. | |
| 6,101,577 A | 8/2000 | Tran | |
| 6,115,809 A | 9/2000 | Mattson, Jr. et al. | |
| 6,134,634 A | 10/2000 | Marshall, Jr. et al. | |
| 6,138,226 A | 10/2000 | Yoshioka et al. | |
| 6,157,998 A | 12/2000 | Rupley, II et al. | |
| 6,167,490 A | 12/2000 | Levy et al. | |
| 6,205,545 B1 | 3/2001 | Shah et al. | |
| 6,212,613 B1 | 4/2001 | Belair | |
| 6,226,732 B1 | 5/2001 | Pei et al. | |
| 6,247,097 B1 | 6/2001 | Sinharoy | |
| 6,253,316 B1 | 6/2001 | Tran et al. | |
| 6,256,727 B1 | 7/2001 | McDonald | |
| 6,256,728 B1 | 7/2001 | Witt et al. | |
| 6,260,131 B1 | 7/2001 | Kikuta et al. | |
| 6,260,138 B1 | 7/2001 | Harris | |
| 6,272,662 B1 | 8/2001 | Jadav et al. | |
| 6,275,917 B1 | 8/2001 | Okada | |
| 6,321,298 B1 | 11/2001 | Hubis | |
| 6,332,189 B1 | 12/2001 | Baweja et al. | |
| 6,341,324 B1 | 1/2002 | Caulk, Jr. et al. | |
| 6,437,789 B1 | 8/2002 | Tidwell et al. | |
| 6,449,671 B1 | 9/2002 | Patkar et al. | |
| 6,457,120 B1 | 9/2002 | Sinharoy | |
| 6,557,083 B1 | 4/2003 | Sperber et al. | |
| 6,594,755 B1 | 7/2003 | Nuechterlein et al. | |
| 6,604,187 B1 | 8/2003 | McGrath et al. | |
| 6,609,189 B1 | 8/2003 | Kuszmaul et al. | |
| 6,658,549 B2 | 12/2003 | Wilson et al. | |
| 6,681,395 B1 | 1/2004 | Nishi | |
| 6,907,600 B2 | 6/2005 | Neiger et al. | |
| 6,912,644 B1 | 6/2005 | O'Connor et al. | |
| 7,007,108 B2 | 2/2006 | Emerson et al. | |
| 7,111,145 B1 | 9/2006 | Chen et al. | |
| 7,143,273 B2 | 11/2006 | Miller et al. | |
| 7,149,872 B2 | 12/2006 | Rozas et al. | |
| 7,213,106 B1 | 5/2007 | Koster et al. | |
| 7,278,030 B1 | 10/2007 | Chen et al. | |
| 7,380,096 B1 | 5/2008 | Rozas et al. | |
| 7,406,581 B2 | 7/2008 | Southwell et al. | |
| 7,546,420 B1 | 6/2009 | Shar et al. | |
| 7,680,988 B1 * | 3/2010 | Nickolls | G06F 12/084 711/130 |
| 7,783,868 B2 | 8/2010 | Ukai | |
| 7,856,530 B1 | 12/2010 | Mu | |
| 7,913,058 B2 | 3/2011 | Rozas et al. | |
| 8,145,844 B2 | 3/2012 | Bruce | |
| 8,239,656 B2 | 8/2012 | Rozas et al. | |
| 8,301,847 B2 | 10/2012 | Dantzig et al. | |
| 8,522,253 B1 | 8/2013 | Rozas et al. | |
| 8,868,838 B1 | 10/2014 | Glasco et al. | |
| 8,930,674 B2 | 1/2015 | Avudaiyappan et al. | |
| 9,047,178 B2 | 6/2015 | Talagala et al. | |
| 2001/0049782 A1 | 12/2001 | Hsu et al. | |
| 2002/0069326 A1 | 6/2002 | Richardson et al. | |
| 2002/0082824 A1 | 6/2002 | Neiger et al. | |
| 2002/0099913 A1 | 7/2002 | Steely, Jr. | |
| 2003/0065887 A1 | 4/2003 | Maiyuran et al. | |
| 2003/0088752 A1 | 5/2003 | Harman | |
| 2004/0034762 A1 | 2/2004 | Kacevas | |
| 2004/0044850 A1 | 3/2004 | George et al. | |
| 2004/0064668 A1 | 4/2004 | Kjos et al. | |
| 2004/0093483 A1 | 5/2004 | Nguyen et al. | |
| 2004/0103251 A1 | 5/2004 | Alsup | |
| 2004/0117593 A1 | 6/2004 | Uhlig et al. | |
| 2004/0117594 A1 | 6/2004 | Vanderspek | |
| 2004/0143727 A1 | 7/2004 | McDonald | |
| 2004/0193857 A1 | 9/2004 | Miller et al. | |
| 2004/0205296 A1 | 10/2004 | Bearden | |
| 2004/0215886 A1 | 10/2004 | Cargnoni et al. | |
| 2004/0225872 A1 | 11/2004 | Bonanno et al. | |
| 2005/0005085 A1 | 1/2005 | Miyanaga | |
| 2005/0027961 A1 | 2/2005 | Zhang | |
| 2005/0060457 A1 | 3/2005 | Olukotun | |
| 2005/0108480 A1 | 5/2005 | Correale et al. | |
| 2005/0154867 A1 | 7/2005 | DeWitt et al. | |
| 2006/0004964 A1 | 1/2006 | Conti et al. | |
| 2006/0026381 A1 | 2/2006 | Doi et al. | |
| 2006/0190707 A1 | 8/2006 | McIlvaine et al. | |
| 2006/0236074 A1 | 10/2006 | Williamson et al. | |
| 2006/0277365 A1 | 12/2006 | Pong | |
| 2008/0077813 A1 | 3/2008 | Keller et al. | |
| 2008/0091880 A1 | 4/2008 | Vishin | |
| 2008/0126771 A1 | 5/2008 | Chen et al. | |
| 2008/0195844 A1 | 8/2008 | Shen et al. | |
| 2008/0215865 A1 | 9/2008 | Hino et al. | |
| 2008/0235500 A1 | 9/2008 | Davis et al. | |
| 2008/0270758 A1 | 10/2008 | Ozer et al. | |
| 2008/0270774 A1 | 10/2008 | Singh et al. | |
| 2008/0282037 A1 | 11/2008 | Kusachi et al. | |
| 2009/0138659 A1 | 5/2009 | Lauterbach | |
| 2009/0157980 A1 | 6/2009 | Bruce | |
| 2009/0158017 A1 | 6/2009 | Mutlu et al. | |
| 2009/0164733 A1 | 6/2009 | Kim et al. | |
| 2009/0172344 A1 | 7/2009 | Grochowski et al. | |
| 2009/0287912 A1 | 11/2009 | Sendag | |
| 2010/0138607 A1 | 6/2010 | Hughes et al. | |
| 2010/0169578 A1 | 7/2010 | Nychka et al. | |
| 2010/0169611 A1 | 7/2010 | Chou et al. | |
| 2010/0211746 A1 | 8/2010 | Tsukishiro | |
| 2011/0010521 A1 | 1/2011 | Wang et al. | |
| 2011/0082980 A1 * | 4/2011 | Gschwind | G06F 12/0886 711/119 |
| 2011/0082983 A1 | 4/2011 | Koktan | |
| 2011/0153955 A1 | 6/2011 | Herrenschmidt et al. | |
| 2012/0005462 A1 | 1/2012 | Hall et al. | |

(56) References Cited

U.S. PATENT DOCUMENTS

| | | | |
|---|---|---|---|
| 2012/0042126 | A1 | 2/2012 | Krick et al. |
| 2013/0019047 | A1 | 1/2013 | Podvalny et al. |
| 2013/0046934 | A1 | 2/2013 | Nychka et al. |
| 2013/0086417 | A1 | 4/2013 | Sivaramakrishnan et al. |
| 2013/0097369 | A1 | 4/2013 | Talagala et al. |
| 2013/0238874 | A1 | 9/2013 | Avudaiyappan et al. |
| 2013/0304991 | A1* | 11/2013 | Bottcher ............ G06F 12/0864 711/122 |
| 2013/0311759 | A1 | 11/2013 | Abdallah |
| 2013/0346699 | A1 | 12/2013 | Walker |
| 2014/0032844 | A1 | 1/2014 | Avudaiyappan et al. |
| 2014/0032845 | A1 | 1/2014 | Avudaiyappan et al. |
| 2014/0032856 | A1 | 1/2014 | Avudaiyappan |
| 2014/0075168 | A1 | 3/2014 | Abdallah |
| 2014/0108730 | A1 | 4/2014 | Avudaiyappan et al. |
| 2014/0281242 | A1 | 9/2014 | Abdallah et al. |
| 2016/0041908 | A1 | 2/2016 | Avudaiyappan |
| 2016/0041913 | A1 | 2/2016 | Avudaiyappan |
| 2016/0041930 | A1 | 2/2016 | Avudaiyappan |

FOREIGN PATENT DOCUMENTS

| | | |
|---|---|---|
| EP | 0706133 | 4/1996 |
| GB | 2343270 A | 5/2000 |
| TW | 200707284 | 3/1995 |
| TW | 539996 B | 7/2003 |
| TW | 200401187 A | 1/2004 |
| TW | 591530 B | 6/2004 |
| TW | I233545 B | 6/2005 |
| TW | I281121 B | 5/2007 |
| WO | 0125921 | 4/2001 |

OTHER PUBLICATIONS

Notice of Allowance from U.S. Appl. No. 13/561,570, dated Oct. 22, 2014, 16 pages.
Notice of Allowance from U.S. Appl. No. 14/922,035, dated Apr. 10, 2017, 21 pages.
Notice of Allowance from U.S. Appl. No. 14/922,035, dated Jan. 27, 2017, 5 pages.
Notice of Allowance from U.S. Appl. No. 14/922,042pages., dated Mar. 30, 2017, 35 pages.
Rotenberg E., et al.,"Trace Cache: a Low Latency Approach to High Bandwidth Instruction Fetching," Apr. 11, 1996, 48 pages.
Techopedia, Cache Memory Definition, www.techopedia.com/definition/6307/cache-memory.
Wallace S., et al.,"Multiple Branch and Block Prediction," Third International symposium on High-Performance Computer Architecture, IEEE, Feb. 1997, pp. 94-103.
Ye J., et al.,"A New Recovery Mechanism in Superscalar Microprocessors by Recovering Critical Misprediction," IEICE Transactions on Fundamentals of Electronics, Communications and Computer Sciences, 2011, vol. E94-A (12), pp. 2639-2648.
Yeh T., et al.,"Increasing the Instruction Fetch Rate Via Multiple Branch Prediction and a Branch Address Cache," 7th International Conference on Supercomputing, ACM, 1993, pp. 67-76.
Final Office Action from U.S. Appl. No. 15/353,053, dated Jun. 16, 2017, 45 pages.
Notice of Allowance from U.S. Appl. No. 15/353,053, dated Sep. 7, 2017, 11 pages.
Barham P., et al., "Xen and the Art of Virtualization," Proceedings of the ACM Symposium on Operating Systems Principles, XP002298786, Oct. 2003, pp. 164-177.
Cooperman G.,"Cache Basics," 2003, pp. 1-3, URL: http://www.ccs.neu.edu/course/com3200/parent/NOTES/cache-basics.html.
Final Office Action from U.S. Appl. No. 13/561,441, dated Oct. 14, 2016, 14 pages.
Final Office Action from U.S. Appl. No. 13/561,441, dated Sep. 26, 2014, 16 pages.
Final Office Action from U.S. Appl. No. 13/561,491, dated Jan. 14, 2015, 14 pages.
Final Office Action from U.S. Appl. No. 13/561,491, dated Nov. 12, 2014, 14 pages.
Final Office Action from U.S. Appl. No. 13/561,491, dated Oct. 13, 2015, 16 pages.
Final Office Action from U.S. Appl. No. 13/561,528, dated Nov. 10, 2014, 19 pages.
Final Office Action from U.S. Appl. No. 14/922,035, dated Oct. 14, 2016, 29 pages.
Final Office Action from U.S. Appl. No. 14/922,042, dated Oct. 14, 2016, 15 pages.
Final Office Action from U.S. Appl. No. 14/922,053, dated May 23, 2017, 43 pages.
Final Office Action from U.S. Appl. No. 14/922,053, dated Oct. 14, 2016, 16 pages.
Garmany J., "The Power of Indexing," archieved on Mar. 9, 2009, 7 pages.
International Preliminary Report on Patentability for Application No. PCT/US2013/051128, dated Feb. 12, 2015, 8 pages.
International Search Report and Written Opinion for Application No. PCT/US2013/051128, dated Oct. 30, 2013, 9 pages.
Jacobson et al., "Path-based Next Trace Prediction," IEEE, 1997, pp. 14-23.
Nanda A.K., et al., "The Misprediction Recovery Cache," International Journal of Parallel Programming, Plenum Publishing Corporation, 1998, vol. 26 (4), pp. 383-415.
Non-Final Office Action from U.S. Appl. No. 13/561,441, dated Dec. 22, 2014, 13 pages.
Non-Final Office Action from U.S. Appl. No. 13/561,441, dated Jan. 9, 2017, 17 pages.
Non-Final Office Action from U.S. Appl. No. 13/561,441, dated Jun. 4, 2014, 12 pages.
Non-Final Office Action from U.S. Appl. No. 13/561,441, dated May 17, 2016, 17 pages.
Non-Final Office Action from U.S. Appl. No. 13/561,491, dated Feb. 8, 2016, 16 pages.
Non-Final Office Action from U.S. Appl. No. 13/561,491, dated Jun. 16, 2014, 13 pages.
Non-Final Office Action from U.S. Appl. No. 13/561,491, dated May 5, 2015, 15 pages.
Non-Final Office Action from U.S. Appl. No. 13/561,528, dated Dec. 19, 2014, 13 pages.
Non-Final Office Action from U.S. Appl. No. 13/561,528, dated Jun. 17, 2014 , 11 pages.
Non-Final Office Action from U.S. Appl. No. 14/922,035, dated Jun. 21, 2016, 13 pages.
Non-Final Office Action from U.S. Appl. No. 14/922,042, dated Apr. 7, 2016, 16 pages.
Non-Final Office Action from U.S. Appl. No. 14/922,042, dated Dec. 14, 2016, 20 pages.
Non-Final Office Action from U.S. Appl. No. 14/922,053, dated Apr. 7, 2016, 15 pages.
Non-Final Office Action from U.S. Appl. No. 14/922,053, dated Dec. 15, 2016, 16 pages.
Notice of Allowance from U.S. Appl. No. 13/561,441, dated Apr. 21, 2017, 20 pages.
Notice of Allowance from U.S. Appl. No. 13/561,441, dated Feb. 2, 2016, 10 pages.
Notice of Allowance from U.S. Appl. No. 13/561,441, dated Jun. 23, 2015, 14 pages.
Notice of Allowance from U.S. Appl. No. 13/561,441, dated Mar. 18, 2015, 8 pages.
Notice of Allowance from U.S. Appl. No. 13/561,441, dated Oct. 21, 2015, 10 pages.
Notice of Allowance from U.S. Appl. No. 13/561,491, dated Dec. 19, 2016, 13 pages.
Notice of Allowance from U.S. Appl. No. 13/561,491, dated Jun. 8, 2016, 12 pages.
Notice of Allowance from U.S. Appl. No. 13/561,491, dated Mar. 31, 2017, 12 pages.
Notice of Allowance from U.S. Appl. No. 13/561,491, dated Sep. 14, 2016, 18 pages.

(56) References Cited

OTHER PUBLICATIONS

Notice of Allowance from U.S. Appl. No. 13/561,528, dated Aug. 3, 2016, 6 pages.
Notice of Allowance from U.S. Appl. No. 13/561,528, dated Feb. 8, 2016, 15 pages.
Notice of Allowance from U.S. Appl. No. 13/561,528, dated Jul. 13, 2015, 14 pages.
Notice of Allowance from U.S. Appl. No. 13/561,528, dated Mar. 31, 2015, 5 pages.
Notice of Allowance from U.S. Appl. No. 13/561,528, dated May 2, 2016, 10 pages.
Notice of Allowance from U.S. Appl. No. 13/561,528, dated Oct. 21, 2015, 9 pages.
Notice of Allowance from U.S. Appl. No. 13/561,570, dated Aug. 27, 2015, 9 pages.
Notice of Allowance from U.S. Appl. No. 13/561,570, dated Dec. 7, 2015, 7 pages.
Notice of Allowance from U.S. Appl. No. 13/561,570, dated Jan. 29, 2015, 9 pages.
Notice of Allowance from U.S. Appl. No. 13/561,570, dated Jun. 20, 2014, 8 pages.
Abandonment from U.S. Appl. No. 14/922,053, dated Dec. 1, 2017, 2 pages.
Final Office action from U.S. Appl. No. 15/654,481, dated Dec. 14, 2017, 45 pages.
Notice of Allowance from U.S. Appl. No. 15/353,053, dated Dec. 37, 2017, 6 pages.

\* cited by examiner

METHOD AND APPARATUS FOR SUPPORTING A PLURALITY OF LOAD ACCESSES OF A CACHE IN A SINGLE CYCLE TO MAINTAIN THROUGHPUT

CROSS REFERENCE TO RELATED APPLICATIONS

This application is a conversion of and claims priority to and the benefit of Provisional Patent Application No. 61/800,498, entitled "SYSTEMS AND METHODS FOR SUPPORTING A PLURALITY OF LOAD ACCESSES OF A CACHE IN A SINGLE CYCLE TO MAINTAIN THROUGHPUT," having a filing Date of Mar. 15, 2013, which is herein incorporated by reference in its entirety.

This application claims priority from and is a continuation-in-part of co-pending U.S. patent application Ser. No. 13/561,528, "Systems and Methods for Supporting a Plurality of Load Accesses of a Cache in a Single Cycle," Karthikeyan Avudaiyappan, filed Jul. 30, 2012, the entire disclosure of which is incorporated herein by reference.

FIELD OF THE INVENTION

Embodiments according to the present invention generally relate to microprocessor architecture and more particularly to the architecture for out-of-order microprocessors.

BACKGROUND OF THE INVENTION

A cache in a central processing unit is a data storage structure that is used by the central processing unit of a computer to reduce the average time that it takes to access memory. It is a memory which stores copies of data that is located in frequently used main memory locations. Moreover, cache memory ("cache") is memory that is smaller than and that may be accessed more quickly than main memory. There are several different types of caches. These include physically indexed physically tagged (PIPT), virtually indexed virtually tagged (VIVT) and virtually indexed physically tagged (VIPT).

Caches that can accommodate multiple accesses in a single cycle provide performance advantages. In particular, such caches feature reduced access latencies. Conventional approaches to accommodating multiple accesses in a single cycle include the use of multi-ported caches and the provision of caches that include a plurality of tag and data banks.

A multi-ported cache is a cache which can serve more than one request at a time. In accessing some conventional caches a single memory address is requested, whereas in a multi-ported cache, N memory addresses can be requested at a time, where N is the number of ports that is possessed by the multi-ported cache. An advantage of a multi ported cache is that greater throughput (e.g., a greater number of load and store requests) may be accommodated. However, the number of cache ports that are needed to accommodate increasingly high levels of throughput may not be practical.

Caches that include a plurality of tag and data banks can serve more than one request at a time as each tag and data bank can serve at least one request. However, when more than one request attempts to coincidentally access the same bank, the request that will be allowed to access the bank must be determined In one conventional approach, arbitration is used to determine which request will be allowed to access a given tag and data bank. In such conventional approaches, the time that it takes to execute the arbitration can delay access to the tag bank and thus delay the triggering of the critical Load Hit signal, typically found in the Level 1 cache of processors.

Further, in a conventional system which supports a plurality of load accesses of a cache in a single cycle, if multiple accesses are accessing the same block within the same cache line, the arbitration scheme selects one access per block and signals a Load Hit (if there is a tag hit) only for the selected access while penalizing the other accesses. This is problematic because only one of the accesses signals a Load Hit while the other same-cycle accesses that are attempting to access the same data return a Load Miss. Further, if conventional systems supporting multiple load accesses in a single cycle encounter a load access that is unaligned, the access request is split into two components before sending it to the Level-1 cache. Because these two components cannot be sent to the Level-1 cache at the same time, such accesses never result in a Level-1 cache hit and are penalized.

BRIEF SUMMARY OF THE INVENTION

Accordingly, a need exists for method and apparatus to sustain throughput in a microprocessor architecture supporting a plurality of load accesses of a data cache that addresses the aforementioned shortcomings of conventional approaches.

In one embodiment, the present invention provides a method wherein a plurality of requests to access the data cache is accessed, and in response, a tag memory is accessed that maintains a plurality of copies of tags for each entry in the tag cache. Tags are identified that correspond to individual requests. The data cache is divided into many banks or "blocks." The data cache is accessed based on the identified tags. A plurality of requests to access the same block of the plurality of blocks of the data cache results in an access arbitration with respect to that block. This block access arbitration is executed in parallel with the access of tags that correspond to individual access requests. Consequently, the penalty to the timing of Load Hit signals that is exacted by arbitration to access tag and data banks found in conventional approaches is avoided.

More specifically, in one embodiment of the present invention, if multiple accesses are accessing the same block, the arbitration scheme can use the upper bits, e.g., virtual tag bits or physical tag bits of the request address to determine if the requests are to the same cache-line in memory. If it is determined that the requests are for the same block and to the same cache-line in memory, then one request is allowed to access the data from the block in memory while the remaining same-cycle requests are provided the data via bypass paths. Accordingly, the other accesses do not need to be penalized and can also signal a Load Hit.

In another embodiment of the present invention, if a load access is unaligned, instead of splitting the request into two components, embodiments of the present invention allow unaligned accesses that do not cross cache-lines to be sent to the L1-cache without splitting into two components. Instead, the request is allowed to access multiple blocks. By allowing a request to access more than one block, unaligned accesses can generate a Level-1 cache hit and get data at pipeline speed.

In one embodiment, a method for supporting a plurality of requests for access to a data cache memory is presented. The method comprises accessing a first plurality of requests to access the data cache memory, wherein the data cache memory comprises a plurality of blocks. Further, responsive to the first plurality of requests to access the data cache memory, the method comprises accessing a tag memory that maintains a plurality of copies of tags for each entry in the data cache memory and identifying tags that correspond to individual requests of the first plurality of requests. The method also comprises performing arbitration in a same clock cycle as the accessing the tag memory and the identifying tags, wherein the arbitration comprises: (a) identifying a second plurality of requests to access the data cache memory from the first plurality of requests, wherein the second plurality of requests accesses a same block within the data cache memory; and (b) selecting each request from the second plurality of requests to receive data from the same block.

In another embodiment, a processor unit configured to perform a method for supporting a plurality of requests for access to a data cache memory is presented. The method comprises accessing a first plurality of requests to access the data cache memory, wherein the data cache memory comprises a plurality of blocks. Further, responsive to the first plurality of requests to access the data cache memory, the method comprises accessing a tag memory that maintains a plurality of copies of tags for each entry in the data cache memory and identifying tags that correspond to individual requests of the first plurality of requests. The method also comprises performing arbitration in a same clock cycle as the accessing the tag memory and the identifying tags, wherein the arbitration comprises: (a) identifying a second plurality of requests to access the data cache memory from the first plurality of requests, wherein the second plurality of requests accesses a same block within the data cache memory; and (b) selecting each request from the second plurality of requests to receive data from the same block.

In a different embodiment, a computer system is presented, wherein the computer system comprises a memory and a processor communicatively coupled to the memory, and wherein the processor is configured to process instructions out of order. The system further comprises a cache system. The cache system comprises a data cache memory configured to store blocks of data, a tag memory configured to stored tags that correspond to the blocks of data and a cache controller operable to implement a method for supporting a plurality of requests for access to a data cache memory. The method comprises accessing a first plurality of requests to access the data cache memory, wherein the data cache memory comprises a plurality of blocks. Further, responsive to the first plurality of requests to access the data cache memory, the method comprises accessing the tag memory that maintains a plurality of copies of tags for each entry in the data cache memory and identifying tags that correspond to individual requests of the first plurality of requests. The method also comprises performing arbitration in a same clock cycle as the accessing the tag memory and the identifying tags, wherein the arbitration comprises: (a) identifying a second plurality of requests to access the data cache memory from the first plurality of requests, wherein the second plurality of requests accesses a same block within the data cache memory; and (b) selecting each request from the second plurality of requests to receive data from the same block.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
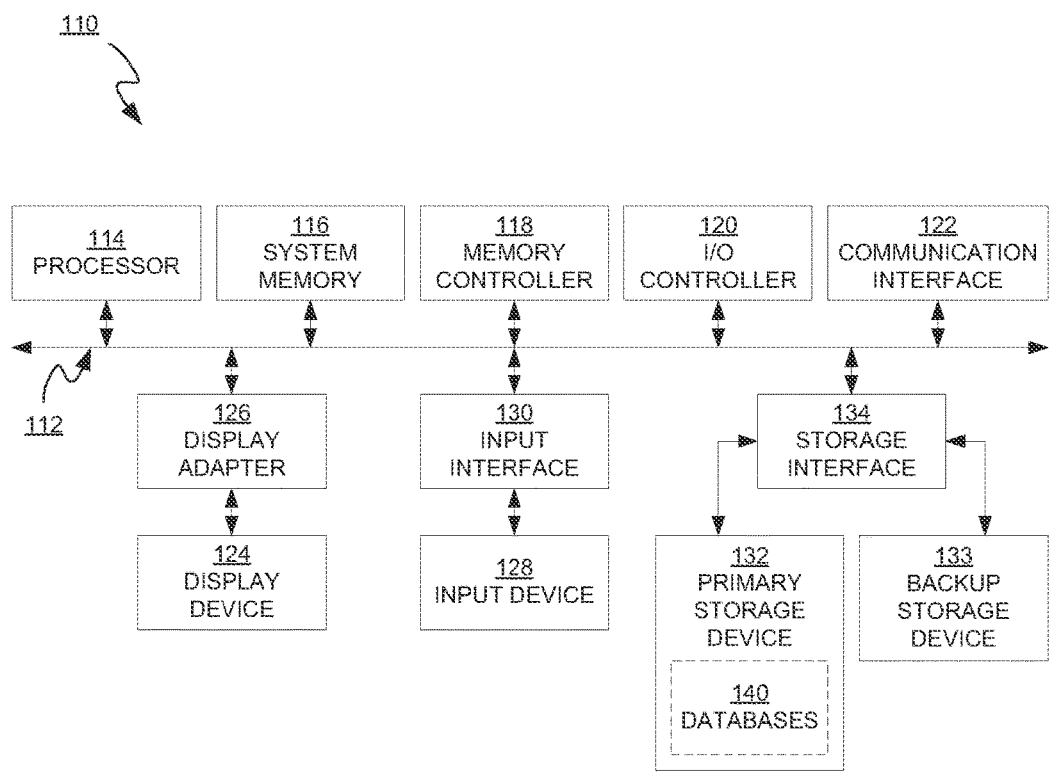
FIG. 1 is a block diagram of an example of a computing system capable of being integrated with a processor of an embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.
Notation and Nomenclature Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "identifying," "selecting," "performing," "determining," (e.g., flowchart 700 of FIG. 7) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of being integrated with a processor 114 of an embodiment of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 of an embodiment of the present invention and a system memory 116.

Processor 114 incorporates embodiments of the present invention and generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. In one embodiment, processor 114 may be an out of order microprocessor. In a different embodiment, processor 114 may be a superscalar processor. In yet another embodiment, processor 114 may comprise multiple processors operating in parallel.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110. Alternatively, databases 140 may represent (be stored on) one or more physically separate devices capable of being accessed by a computing device, such as computing system 110.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Method and Apparatus for Supporting a Plurality of Load Accesses of a Cache in a Single Cycle to Maintain Throughput Embodiments of the present invention provide a system and method for supporting a plurality of load accesses of a data cache addressing the shortcomings of conventional approaches. In one embodiment, the present invention provides a method wherein a plurality of requests to access the data cache is accessed, and in response, a tag memory is accessed that maintains a plurality of copies of tags for each entry in the tag cache. Tags are identified that correspond to individual requests. The data cache is divided into many banks or "blocks." The data cache is accessed based on the identified tags. A plurality of requests to access the same block of the plurality of blocks of the data cache results in an access arbitration with respect to that block. This block access arbitration is executed in parallel with the access of tags that correspond to individual access requests. Consequently, the penalty to the timing of Load Hit signals that is exacted by arbitration to access tag and data banks found in conventional approaches is avoided.

In one embodiment of the present invention, if multiple accesses are accessing the same block, the arbitration scheme can use the upper bits, e.g., virtual tag bits or physical tag bits of the request address to determine if the requests are to the same cache-line in memory. If it is determined that the requests are for the same block and cache-line in memory, then one request is allowed to access the data from the block in memory while the remaining same-cycle requests are provided the data via bypass paths. Accordingly, the other accesses do not need to be penalized and can also signal Load Hit. It should be noted that the data is only provided to the remaining same-cycle requests via the bypass path if the requests are to the same cache-line and block as the request receiving the data directly from the accessed block. If the additional requests are to the same block in a different cache-line, for example, a Load Miss would be signaled for the requests.

In another embodiment of the present invention, if a load access is unaligned, instead of splitting the request into two components, the present invention allows unaligned accesses that do not cross cache-lines to be sent to the L1-cache without splitting into two components. Instead, the request is allowed to access multiple blocks. By allowing a request to access more than one block, unaligned accesses can generate a Level-1 cache hit and get data at pipeline speed.

Figure 2:
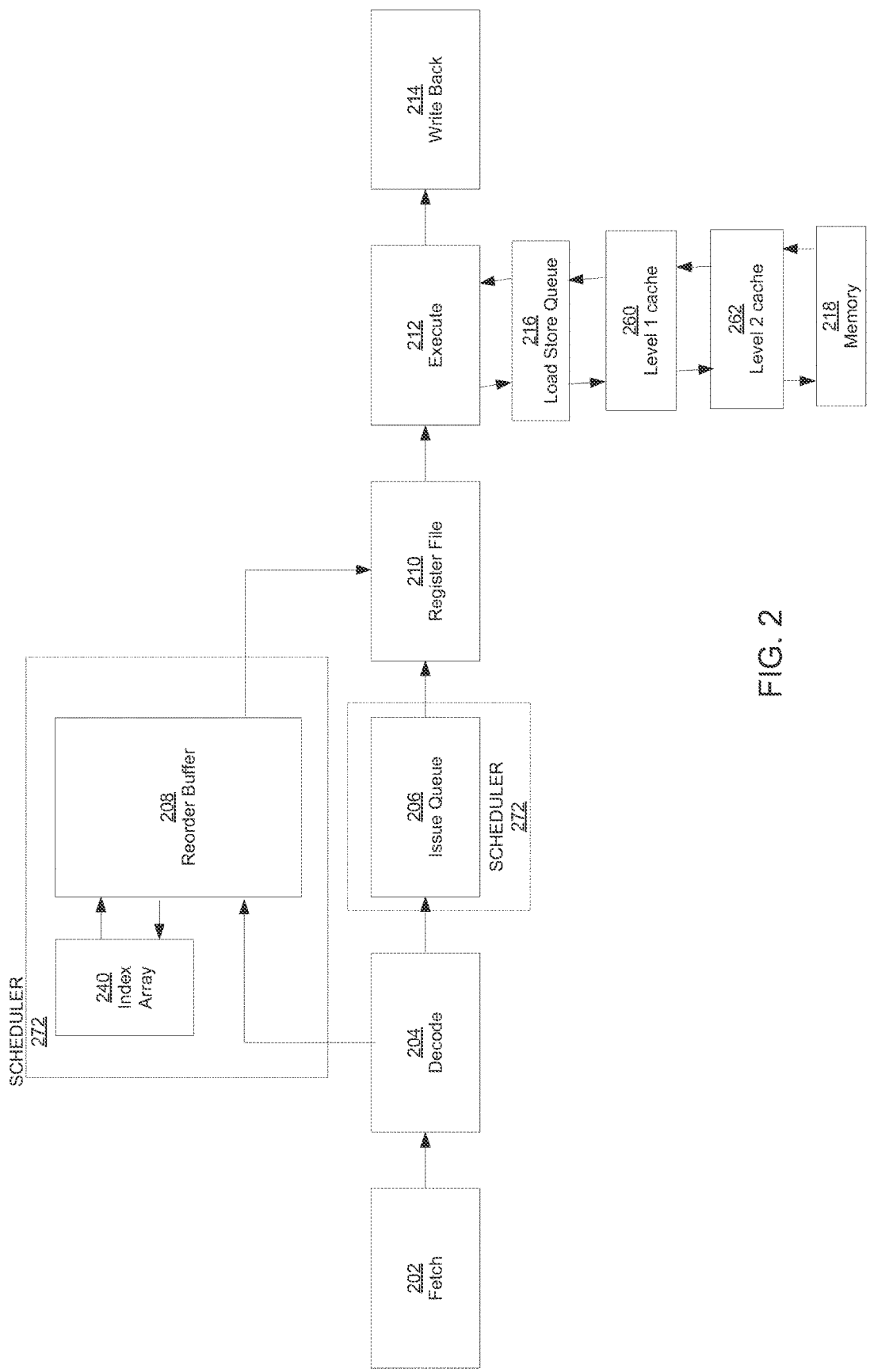
FIG. 2 is a block diagram of an exemplary pipeline for an out-of-order microprocessor in accordance with embodiments of the present invention.

FIG. 2 is a block diagram of an exemplary pipeline for an OOO microprocessor in accordance with embodiments of the present invention.

Instructions are fetched at the fetch stage 202 and placed in the instruction fetch queue (IFQ) (not shown) within fetch stage 202. The instructions are generally the original assembly instructions found in the executable program. These instructions reference the architectural registers which are stored in register file 210. If the first fetched instruction was to be interrupted or raise an exception, the architectural register file 210 stores the results of all instructions until that point. Stated differently, the architectural register file stores the state that needs to be saved and restored in order to return back to the program during debugging or otherwise.

In an OOO microprocessor, the instructions execute out-of-order while still preserving data dependence constraints. Because instructions may finish in an arbitrary order, the architectural register file 210 cannot be modified by the results of instructions as they finish because it would make it difficult to restore their values accurately in the event of an exception or an interrupt. Hence, every instruction that enters the pipeline is provided a temporary register where it can save its result. The temporary registers are eventually written into the architectural register file in program order when the associated instruction retires. Thus, even though instructions are being executed out of order, the contents of the architectural register files change as though they were being executed in program order.

The ROB 208 facilitates the process of instruction retirement. After the instructions are dispatched from the fetch unit 202, they are decoded by decode module 204 and are placed in the ROB 208 and issue queue 206 (IQ). The ROB 208 and IQ 206 may be part of a scheduler module 272. As instructions are issued out of IQ 206 out of order, they are executed by execute module 212.

In one embodiment, the write back module 214 will write the resulting values from those instructions back to the temporary registers in ROB 208 and rely on the ROB 208 to facilitate committing or "retiring" the instructions in order. However, in a different embodiment, write back module 214 writes the values resulting from instruction execution directly into register file 210 without sorting them. The unordered elements are added in physical memory to the register file 210 in an unordered fashion and are then retired to the architectural files in order at the retirement stage using a ROB initiated protocol.

The instructions issued out of order from the IQ 206 may also comprise loads and stores. As explained above, when loads and stores are issued out of order from the IQ 206, there are memory dependencies between them that need to be resolved before those instructions can be committed. Accordingly, the store instructions are stored in order in a Load Store Queue (LSQ) 216 while the dependencies between the loads and stores are resolved with the help of ROB 208.

A load instruction, for example, uses registers in the register file 210 to compute an effective address and, subsequently, sends a request to memory to access data associated with the address. The memory stage typically comprises a Level-1 cache 260, a Level-2 cache 262 and main memory 218. In one embodiment, the Level-1 cache 260 supports multiple load accesses of a data cache in a single clock cycle as will be explained further in connection with FIG. 3.

Figure 3:
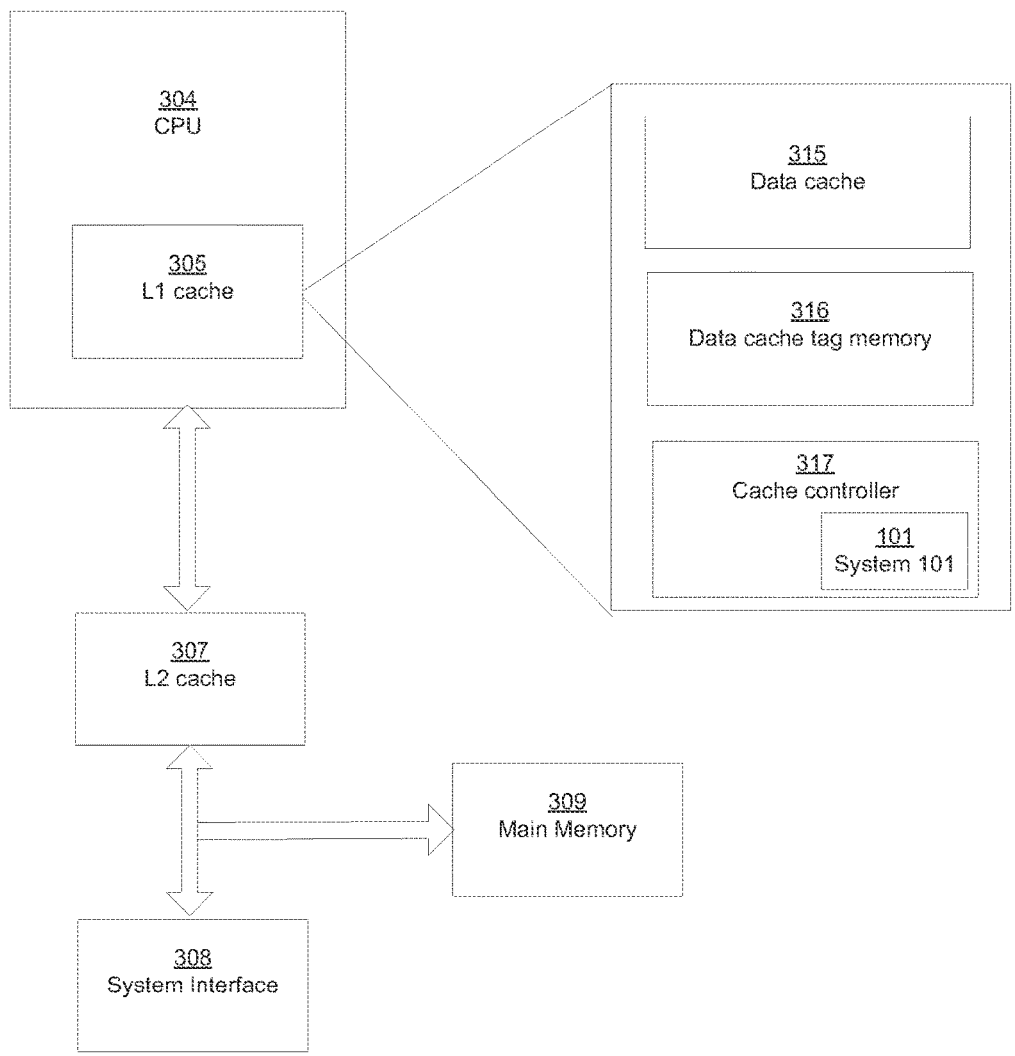
FIG. 3 is a high level block diagram illustrating the components of a L1-cache system supporting a plurality of load accesses of a data cache in a single clock cycle accordance with embodiments of the present invention.

FIG. 3 is a high level block diagram illustrating the components of a L1-cache system supporting a plurality of load accesses of a data cache in a single clock cycle in accordance with embodiments of the present invention. System 101 enables tags corresponding to data sought by a plurality of load requests to a level one data cache (that has a plurality of data blocks to accommodate the plurality of requests) to be obtained within a single clock cycle. Moreover, as a part of the operation of system 101, block access arbitrations involving the plurality of load requests to the level one data cache are executed within the same clock cycle. Consequently, a throughput of a plurality of load accesses is accommodated and the penalty to the timing of load hit signals that is exacted by arbitration in conventional approaches is avoided. FIG. 3 shows system 101, level one (L1) cache 305, level one (L1) data cache 315, data cache tag memory 316, L1 cache controller 317, CPU 304, level two (L2) cache 307, main memory 309 and system interface 308.

Referring to FIG. 3, L1 cache 305 is a Level-1 or "primary" cache and L2 cache 307 is a Level-2 or "secondary" cache. Requests that miss the L1 cache access L2 cache, incurring higher latency (but less than the latency for accessing main memory). In one embodiment, L1 cache 305 can be formed as a part of CPU 304. In one embodiment, as is shown in FIG. 3, L1 cache 305 can include L1 data cache 315, data cache tag memory 316 and L1 cache controller 317. In one embodiment, L1 data cache 315 can be divided into a plurality of data blocks. In other embodiments, L1 data cache 315 can be divided into other numbers of data blocks that have the capacity to store other amounts of data. In one embodiment, dividing the L1 data cache into a plurality of data blocks facilitates the accessing of L1 data cache by multiple load accesses in the same clock cycle. In one embodiment, conflicting requests for access that seek to access the same block of L1 data cache 315 at the same time can be resolved using arbitration. In one embodiment, the data blocks can include cache line entries that are accessed by loads.

Data cache tag memory 316 is configured to maintain tag entries for each of the cache line entries stored in L1 data cache 315. In one embodiment, as part of the aforementioned configuration, and as discussed in parent application U.S. patent application Ser. No. 13/561,528, "Systems and Methods for Supporting a Plurality of Load Accesses of a Cache in a Single Cycle," Karthikeyan Avudaiyappan, filed Jul. 30, 2012, data cache tag memory 316 maintains a plurality of copies of the tags that correspond to the entries of L1 data cache 315. In particular, each request to access L1 data cache 315 is accorded a dedicated copy of tags corresponding to the entries of L1 data cache 315. This manner of maintaining tag entries facilitates the identification of tags that are associated with the cache line entries within a single clock cycle. In one embodiment, an identification of a tag can be completed in the same clock cycle in which an arbitration involving an access request (e.g., load request) to L1 data cache 315 for data associated with the tag is executed. In one embodiment, access requests (e.g., load requests) to L1 data cache 315 trigger a search of data cache tag memory 316 for the tag that corresponds to the data that is sought by the load request.

Figure 4:
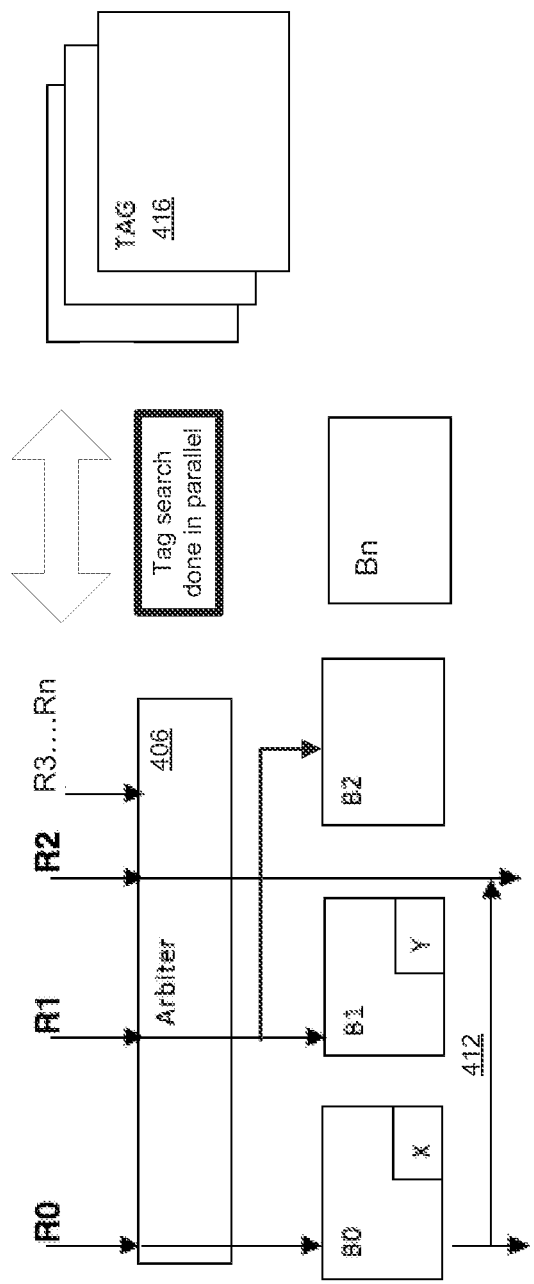
FIG. 4 is a block diagram providing an overview of the manner in which plurality of load accesses to a data cache in a single cycle while maintaining throughput are supported in accordance with embodiments of the present invention.

FIG. 4 is a block diagram providing an overview of the manner in which plurality of load accesses to a data cache in a single cycle while maintaining throughput are supported in accordance with embodiments of the present invention. Referring to FIG. 4, system 101, responsive to a receipt by L1 cache 305 of a plurality of request to access L1 data cache 315 of L1 cache 305, executes a search of a data cache tag memory 316 such that tags that correspond to data sought by the plurality of requests are identified in parallel with the execution of any arbitration operations that are associated with the requests. This is illustrated in FIG. 4, where arbitration operations associated with access requests, R0 to Rn, are shown as being executed in parallel with a search of data cache tag memory 416. In one embodiment, the aforementioned action of system 101 operates to avoid a deleterious impact of arbitration operations on the timing of load hit signals. In particular, system 101, supported by duplicated data cache tag memory 316 and blocked L1 data cache 315, facilitates the access of a cache by several load requests in one clock cycle without penalizing cache hit latency and throughput.

In one embodiment, access requests to the same block are resolved using an arbiter 406, wherein the upper bits of the request address are used to disambiguate cases where the same block in the same cache line are being accessed. Multiple requests cannot access the same block at the same time because each block only has a single read and write port. A request accessing L1 cache searches tag memory 416 and participates in arbitration for data-blocks simultaneously in the same cycle as discussed above. If two access requests, e.g., R0 and R2 access requests to the same block, arbiter 406 uses the upper bits of the request address, e.g., virtual tag in a VIVT cache system to recognize the access request as being to the identical cache-line and allows one of the requests to access the block directly while the other requests receive the data from the block through a bypass path. For example, FIG. 4 shows that request R0 is able to access block B0 through its read port while request R2 receives the same information through bypass path 412.

In one embodiment, unaligned load access requests that do not cross the cache-line may be sent to the L1-cache without splitting into two components. As mentioned above, in the prior art, an extra cycle was utilized to split the request into two components. Embodiments of the present invention, however, allow a request to access more than one block. For example, if R1 in FIG. 4 is an unaligned load access request that straddles both blocks B1 and B2, instead of splitting it into two requests, embodiments of the present invention would allow request R1 to access both blocks B1 and B2. By allowing a request to access more than one block, unaligned access can generate a L1 cache hit and get data at pipeline speed. It should be noted, however, that unaligned load accesses result in Load Hits only when they are able to access both blocks being accessed. Since unaligned load accesses arbitrate for two blocks, it is possible for an access to lose the arbitration for one of the blocks. In this case, the unaligned load access will signal a Load Miss.

In one embodiment, system 101 can be located in cache controller 317. In other embodiments, system 101 can be separate from cache controller 317, but operate cooperatively therewith.

Referring again to FIG. 3, main memory 309 includes physical addresses that store the information that is copied into cache memory. In one embodiment, when the information that is contained in the physical addresses of main memory that have been cached is changed, the corresponding cached information is updated to reflect the changes made to the information stored in main memory. Also shown in FIG. 3 is system interface 308.

Operation

Figure 5:
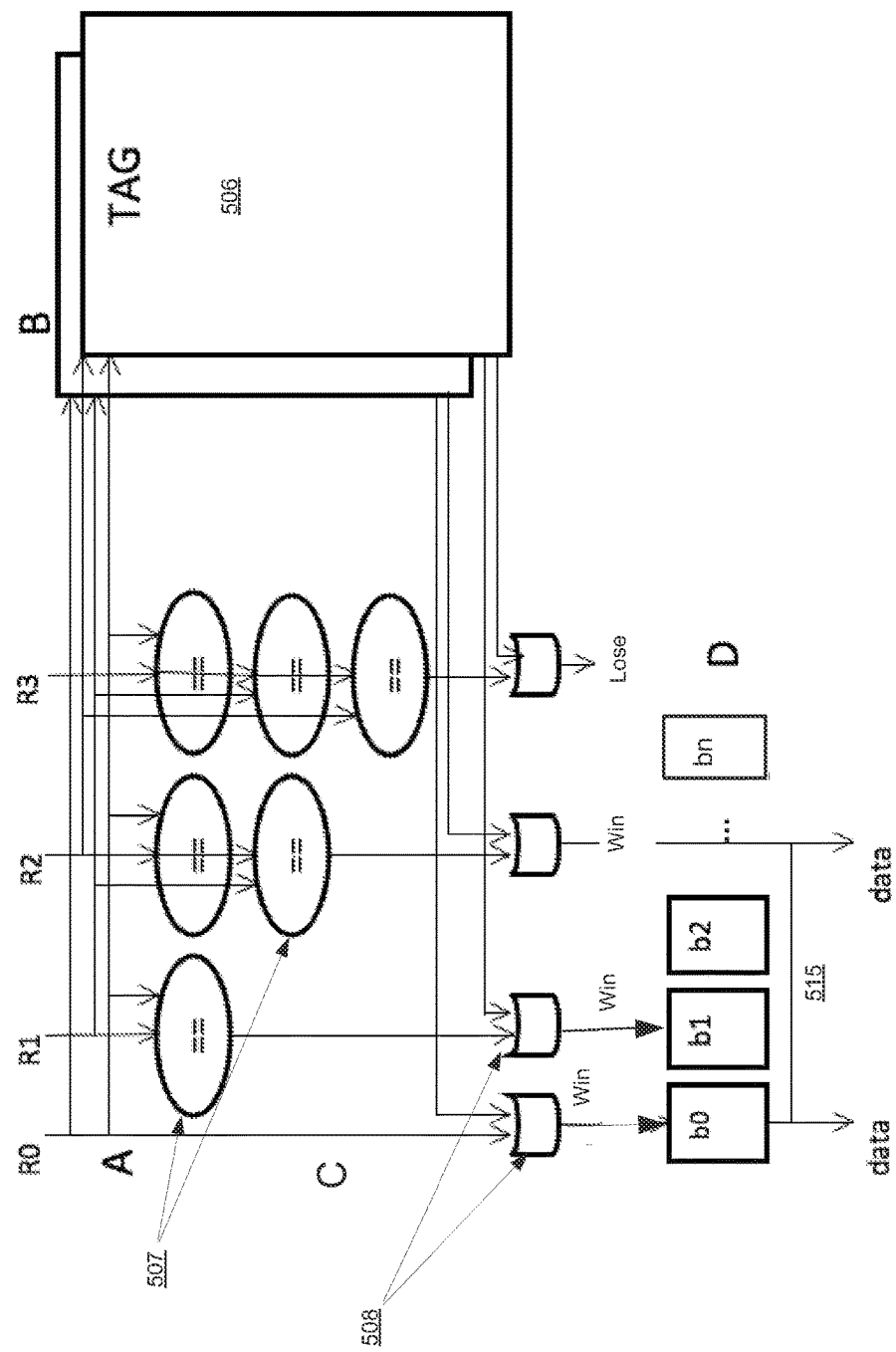
FIG. 5 illustrates, in detail, operations performed for supporting a plurality of load accesses of data cache in a single cycle while maintaining throughput according to embodiments of the present invention.

FIG. 5 illustrates, in detail, operations performed by system 101 for supporting a plurality of load accesses of data cache in a single cycle while maintaining throughput according to embodiments of the present invention. These operations, which relate to supporting a plurality of load accesses to a data cache are illustrated for purposes of clarity and brevity. It should be appreciated that other operations not illustrated by FIG. 5 can be performed in accordance with other embodiments of the present invention.

Referring to FIG. 5, at A, a plurality of requests, R0-R3 are received within a same cycle. In FIG. 5, two of the plurality of requests, R0 and R2, attempt to access the same data block in the same cache line, b0. Meanwhile, requests R1 and R3 attempt to access the same block but different cache lines.

In one embodiment, the first step comprises performing the tag read operation. The plurality of requests, R0-R3, access data cache tag memory 506 at B to determine a tag hit or miss. In other words, the tag memory 506 is searched and tags residing therein that are associated with the data sought by the plurality of requests to access L1 data cache 315 are identified.

At the same time as the tag memory is searched, in the same cycle, at C, the arbiter 406 marks the loads accessing the same block and same cache line. The arbiter 406, for example, may comprise comparators 507 to compare the addresses of the requests, R0 to R3 to determine if they access the same block. In one embodiment, the arbitration process may compare the block bits e.g., Virtual Address bits 6:3 and the virtual tag bits, e.g., Virtual address bits 31:6 of the requests to determine which requests are accessing the same block and cache line respectively to select the true winner and bypass winner(s) per accessed block. In the example of FIG. 5, for example, by comparing the lower bits (block bits) and the upper bits (virtual tag bits), the arbiter would determine that requests R0 and R2 are attempting to access the same block within the same cache line while requests R1 and R3 are accessing the same block but different cache lines. A true winner, e.g., request R0 would access the data from the cache block, e.g., b0 directly from the read port of the block, while a bypass winner, e.g., request R2 would access the data indirectly through a bypass path 515.

After arbitration, the true-winner and bypass-winner(s) are selected. A request is identified as a winner if all the blocks it is accessing are satisfied either directly or via bypass. Accordingly, both R0 and R2 are identified as winners in the same cycle, wherein R0 is the true-winner and accesses block b0 directly, and R2 is a bypass winner and accesses data from block b0 through bypass path 515. By comparison, conventional cache systems would need to signal a L1-miss for the R2 access in the same cycle because it would either not analyze the upper bits of the request access address at all or would not analyze the upper bits till subsequent cycles.

A final hit or miss signal can be generated, in one embodiment, by using AND gates 508, wherein the AND gates are used to AND a tag hit or tag miss signal from the data cache tag memory with the result from the arbitration to generate a final Load Hit or a Load Miss signal. The result of AND gates 508, in other words, is the logical conjunction of a tag hit or miss signal from the data cache tag memory with the result from the arbitration. If, for example, arbitration indicates that R0 is a winner and a tag hit is obtained from data cache tag memory, then a Load Hit is generated using the AND gate associated with request R0.

Requests that result in a tag hit and are true or bypass winners signal a "load hit" and access data either directly or via a bypass path, e.g., requests R0, R1 and R2. By comparison, other requests signal a "load miss" and access the L2 cache, e.g., request R3. As shown in FIG. 5, both R0 and R2 are identified as winners and return L1-hit signals. Because the virtual tag bits of R1 and R3 do not match, only R1 is identified as a winner and accesses block b1 directly. By contrast, request R3 is identified as a loser and returns a L1-miss. Subsequently, the plurality of access requests, except the arbitration losers, e.g. R3, access data cache 315 using the tags that are identified at B.

At D, the data that is sought by the access requests are identified in the L1 data cache 315 and read (e.g., loaded). The data read is typically performed in the cycle following the arbitration.

In a different embodiment, instead of a VIVT cache, a VIPT or a PIPT cache may be used. In this embodiment, instead of using virtual tag bits and block bits, the physical tag bits and block bits are used to determine the true winner and bypass winner per access block. For caches that use physical tags, the first step of the arbitration process involves performing a tag-compare in parallel with marking requests accessing the same block using block bits. In the second step of the arbitration process, after getting the physical address from the Translation Lookaside Buffer (TLB), the physical tag bits 39:6 are compared in parallel to tag compare of tag memory to select winner and bypass winners per accessed block. The result of this step is to signal a L1-cache hit for the true winner and bypass winner(s) and a L1-cache miss for losers.

In one embodiment, if any of the requests are unaligned load accesses, which do not cross a cache-line, they are sent to the L1-cache without splitting the request into two components. Instead, the unaligned load access is allowed to access multiple blocks at the same time. In other words, the unaligned load access is allowed to access all the blocks over which the unaligned load request spans. By allowing a request to access more than one block, unaligned accesses can generate a L1-cache hit and get data at pipeline speed. In order for the unaligned access request to return data that is the same size as a regular block, e.g., b0, b1, b2 etc., a multiplexer can be used, in one embodiment, to filter and arrange the data from the multiple blocks into a regular sized access block. For example, if R1 in FIG. 5 is an unaligned load access request straddling blocks b1 and b2, embodiments of the present invention will allow R1 to signal a Load Hit and access both b1 and b2 simultaneously. However, a multiplexer will be used to select only the bits spanned by the R1 access request.

In one embodiment, as discussed herein, L1 data cache 315 can be organized into a plurality of blocks and the tags that correspond to data that is maintained in L1 data cache 315 can be duplicated and stored in data cache tag memory 316. Moreover, as discussed herein, the organization of data cache 315 into blocks enable several loads to be supported in a single cycle even if they access the same data block within the same cache line (e.g., have the same address) and even if they are unaligned load accesses.

Figure 6:
FIG. 6 shows components of a system for supporting a plurality of load accesses of a cache in a single cycle according to one embodiment.

Components of System for Supporting a Plurality of Load Accesses of a Cache in a Single Cycle to Maintain Throughput According to One Embodiment FIG. 6 shows components of a system 101 for supporting a plurality of load accesses of a cache in a single cycle according to one embodiment. In one embodiment, components of system 101 implement a procedure for supporting a plurality of load accesses. In the FIG. 6 embodiment, components of system 101 include load request accessor 615, tag memory accessor 616 and cache accessor 617. Further, cache accessor comprises arbiter module 620.

Load request accessor 615 accesses a plurality of load requests that seek to access data stored in an L1 data cache (e.g., 315 in FIG. 3). In one embodiment, in some cases, more than one load request of the plurality of load requests can seek to access the same data block in the L1 data cache. In such cases, an arbitration is executed to decide which of the load requests will be allowed to access that block of the L1 data cache.

Tag memory accessor 616, in response to the receipt of a plurality of load requests, searches in parallel, respective copies of the tags of a data cache tag memory (e.g., 316 in FIG. 3) that correspond to the entries of an L1 data cache (e.g., 315 in FIG. 3). In one embodiment, each load request is accorded a dedicated copy of tags that correspond to the entries of the L1 data cache. This manner of maintaining tag entries facilitates the identification of tags that are associated with the cache line entries within a single clock cycle. In one embodiment, an arbitration involving an access request (e.g., load request) to a block of the L1 data cache for data associated with a tag is executed within the same clock cycle in which an identification of the tag is completed. In one embodiment, an arbitration involving multiple requests accessing the same block within the same cache line of the L1 data cache are completed and result in L1 Load Hit signals in the same cycle in which an identification of an associated tag is completed.

Cache accessor 617 accesses a plurality of data blocks of the L1 data cache using the tags that are identified by tag memory accessor 616. In one embodiment, the plurality of data blocks facilitates the accessing of the L1 data cache by multiple access requestors in the same clock cycle. In one embodiment, conflicting requests for access that seek to access the same block of the L1 data cache at the same time can be resolved using arbiter module 620. The arbiter module, for example, can use the virtual tag (upper bits) and block bits (lower bits) as discussed above to determine if the access requests are to the same block and the same cache line. If the access requests are to the same block and same cache line, then a Load Hit signal is returned for the true winner and any bypass winners. If the requests are to the same block but different cache lines, a Load Hit signal is returned only for the winner while a Load Miss is returned for the losers. Further, in one embodiment, if the load request is to an unaligned load, arbiter module 620 allows the request to return a Load Hit signal and access multiple blocks at the same time.

Figure 7:
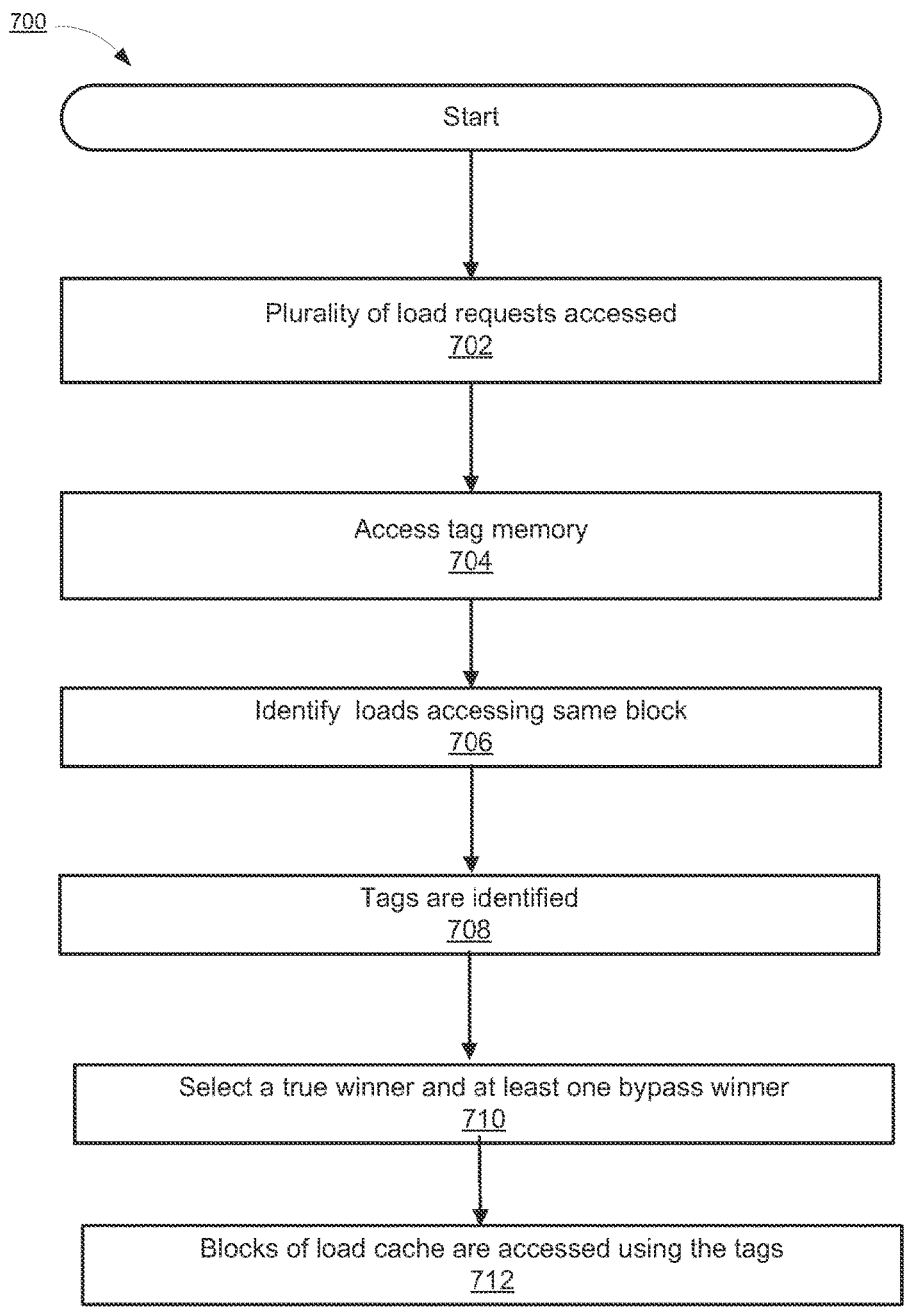
FIG. 7 shows a flowchart of a method for supporting a plurality of load accesses of a data cache in a single cycle to maintain throughput according to one embodiment.

Method for Supporting a Plurality of Load Accesses of a Cache in a Single Cycle to Maintain Throughput According to One Embodiment FIG. 7 shows a flowchart 700 of a method for supporting a plurality of load accesses of a data cache in a single cycle to maintain throughput according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 702, a plurality of load requests to access a data cache are accessed within a same cycle. In one embodiment, the data cache can include a plurality of blocks that can accommodate the plurality of load requests. In one embodiment, the plurality of load requests can include a plurality of load requests that seek to access the same block of the same cache line of the aforementioned data cache.

At step 704, a tag memory is accessed that maintains a plurality of copies of the tags that correspond to the entries of the data cache.

At step 706, in the same cycle as the access to the tag memory, as part of an arbitration process, the plurality of load requests seeking accessing to the same block within the same cache line are identified.

At step 708, tags are compared and identified as corresponding to individual load requests of the plurality of load requests received by the L1 cache. In one embodiment, the tags are compared and identified in the same cycle as the access to tag memory. In one embodiment, each load request is accorded a dedicated copy of the set of tags that correspond to the entries located in the data cache.

At step 710, of the plurality of load requests identified as accessing the same block within the same cache line, a true winner and at least one bypass winner are selected to conclude the arbitration process. In one embodiment, a Load Hit signal is returned for the true winner and any bypass winners.

At step 712, the blocks of data cache are accessed based on the tag that are identified as corresponding to the individual requests. In one embodiment, for the plurality of load requests that are identified as accessing the same block, a true winner accesses the data block identified by the associated tag directly while the bypass winner(s) access the data through a bypass path.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for supporting a plurality of requests for access to a data cache memory, said method comprising:
    accessing a first plurality of requests to access said data cache memory, wherein said data cache memory comprises a plurality of blocks;
    responsive to said first plurality of requests to access said data cache memory, accessing a tag memory that maintains a plurality of tags for each entry in said data cache memory and identifying tags that correspond to individual requests of said first plurality of requests, wherein said plurality of tags are maintained to support multiple access requests to said data cache memory in a single clock cycle; and
    performing arbitration in a same clock cycle as said accessing said tag memory and said identifying tags, wherein said arbitration comprises:
        identifying a second plurality of requests to access said data cache memory from said first plurality of requests, wherein said second plurality of requests accesses a same block in a same cache-line within said data cache memory; and
        identifying, by an arbiter, a true winner and at least one bypass winner from said second plurality of requests, wherein said true winner accesses data from said same block directly and wherein said at least one bypass winner accesses data from said same block through a bypass path of the true winner.

2. The method of claim 1, further comprising:
    accessing said data cache memory based on said tags that correspond to said individual requests, wherein both said true winner and said at least one bypass winner access data from said same block in a same cycle, and wherein both said true winner and said at least one bypass winner signal a Load Hit in said same cycle.

3. The method of claim 1, wherein said identifying a second plurality of requests comprises analyzing a set of lower address bits and a set of upper address bits of said first plurality of requests.

4. The method of claim 3, wherein said set of upper address bits are selected from a group consisting of: virtual tag bits and physical tag bits.

5. The method of claim 1, wherein at least one of said first plurality of requests is an unaligned load access request, and wherein said arbitration further comprises allowing said unaligned load access request to access multiple blocks within said data cache memory, wherein said multiple blocks comprise blocks straddled by an address of said unaligned load access request.

6. A processor unit configured to perform a method for supporting a plurality of requests for access to a data cache memory, said method comprising:

accessing a first plurality of requests to access said data cache memory, wherein said data cache memory comprises a plurality of blocks;

responsive to said first plurality of requests to access said data cache memory, accessing a tag memory that maintains a plurality of tags for each entry in said data cache memory and identifying tags that correspond to individual requests of said first plurality of requests, wherein said plurality of tags are maintained to support multiple access requests to said data cache memory in a single clock cycle; and performing arbitration in a same clock cycle as said accessing said tag memory and said identifying tags, wherein said arbitration comprises:

identifying a second plurality of requests to access said data cache memory from said first plurality of requests, wherein said second plurality of requests accesses a same block in a same cache-line within said data cache memory; and identifying, by an arbiter circuit, a true winner and at least one bypass winner from said second plurality of requests, wherein said true winner accesses data from said same block directly from a read port of the same block and wherein said at least one bypass winner accesses data indirectly from said same block through a bypass path of the true winner.

7. The processor unit as described in claim 6, wherein said method further comprises:

accessing said data cache memory based on said tags that correspond to said individual requests, wherein both said true winner and said at least one bypass winner access data from said same block in a same cycle, and wherein both said true winner and said at least one bypass winner signal a Load Hit in said same cycle.

8. The processor unit as described in claim 6, wherein said identifying a second plurality of requests comprises analyzing a set of lower address bits and a set of upper address bits of said first plurality of requests.

9. The processor unit as described in claim 6, wherein said set of upper address bits are selected from a group consisting of: virtual tag bits and physical tag bits.

10. The processor unit as described in claim 6, wherein at least one of said first plurality of requests is an unaligned load access request, and wherein said arbitration further comprises allowing said unaligned load access request to access multiple blocks within said data cache memory, wherein said multiple blocks comprise blocks straddled by an address of said unaligned load access request.

11. An apparatus comprising:

a memory;

a processor communicatively coupled to said memory, wherein said processor is configured to process instructions out of order; and a cache system, comprising:

a data cache memory configured to store blocks of data;

a tag memory configured to store tags that correspond to said blocks of data; and a cache controller supporting a plurality of requests for access to the data cache memory, the cache controller including a plurality of blocks, a tag memory that maintains a plurality of tags for each entry in said data cache memory, wherein said plurality of tags are maintained to support multiple access requests to said data cache memory and identification of tags for each access request in the multiple access requests in a single clock cycle, and an arbiter circuit to perform arbitration in a same clock cycle as said accessing said tag memory and said identifying tags, wherein the arbiter comprises:

a comparator to compare an address of a first request to access the data cache memory and an address of a second request to access the data cache memory and determine whether the first request and the second request access a same block in a same cache-line within the data cache memory such that the arbiter circuit identifies a true winner and a bypass winner from the first request and the second request, wherein said true winner accesses data from said same block directly from the read port of the same block and wherein the bypass winner accesses data from said same block indirectly through a bypass path of said true winner.

12. The apparatus of claim 11, wherein both said true winner and said at least one bypass winner access data from said same block in a same cycle, and wherein both said true winner and said at least one bypass winner signal a Load Hit in said same cycle.

13. The apparatus of claim 11, wherein comparator analyzes a set of lower address bits and a set of upper address bits of the first request and the second request to determine whether the first request and the second request access the same block in the same cache-line within the data cache memory.

14. The apparatus of claim 11, wherein at least one of the first request and the second request is an unaligned load access request, and wherein the arbiter circuit allows said unaligned load access request to access multiple blocks within said data cache memory, wherein said multiple blocks comprise blocks straddled by an address of said unaligned load access request.

* * * * *